United States Patent
Asher

(12) 
(10) Patent No.: US 9,208,593 B1
(45) Date of Patent: Dec. 8, 2015

(54) PROXIMITY-BASED DETAIL REDUCTION OF GEOGRAPHIC DATA

(75) Inventor: Michael L. Asher, Green Cove Springs, FL (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 1953 days.

(21) Appl. No.: 11/708,835

(22) Filed: Feb. 21, 2007

(51) Int. Cl.
 *G06T 11/20* (2006.01)
 *G06T 11/40* (2006.01)

(52) U.S. Cl.
 CPC .............. *G06T 11/40* (2013.01); *G06T 11/203* (2013.01)

(58) Field of Classification Search
 None
 See application file for complete search history.

(56) References Cited

U.S. PATENT DOCUMENTS

| | | | |
|---|---|---|---|
| 5,566,288 A * | 10/1996 | Koerhsen ...................... | 345/442 |
| 5,983,224 A | 11/1999 | Singh et al. | |
| 6,249,740 B1 * | 6/2001 | Ito et al. ......................... | 701/200 |
| 6,310,564 B1 | 10/2001 | Fujimoto | |
| 6,343,301 B1 * | 1/2002 | Halt et al. ...................... | 701/450 |
| 6,348,925 B1 | 2/2002 | Potu | |
| 6,369,825 B1 | 4/2002 | Nakano | |
| 6,674,434 B1 * | 1/2004 | Chojnacki et al. ............. | 345/428 |
| 6,704,648 B1 * | 3/2004 | Naik et al. ..................... | 701/532 |
| 6,993,538 B2 * | 1/2006 | Gray ............................. | 340/988 |
| 7,477,988 B2 * | 1/2009 | Dorum .......................... | 701/410 |
| 7,552,008 B2 * | 6/2009 | Newstrom et al. ............ | 701/468 |

OTHER PUBLICATIONS

Usery, A Feature Based Geographic Information System Model, Jul. 7, 1996, Photogrammetric Engineering & Remote Sensing, vol. 62, pp. 833-838.*

* cited by examiner

*Primary Examiner* — M Good Johnson
(74) *Attorney, Agent, or Firm* — Fay Kaplun & Marcin, LLP

(57) ABSTRACT

A system and method for storing a plurality data points, each data point representing a geographic location, a first set of data points representing a first geometric object and a second set of data points representing a second geometric object. The system and method then remove a first data point from the first set of data points representing the first geometric object based on at least a distance between a first location represented by the first data point and a second location represented by a second data point of the second set of data points representing a second geometric object.

20 Claims, 3 Drawing Sheets

| Layer | Geographic Feature |
|---|---|
| 1 | Land/Water Boundaries |
| 2 | Roads |
| 3 | Buildings |
| 4 | Fiber-Optic Cables |
| 5 | Electrical Cables |
| 6 | Water Lines |

10, 20, 30, 40, 50, 60

PROXIMITY-BASED DETAIL REDUCTION OF GEOGRAPHIC DATA

BACKGROUND INFORMATION

Geographic Information Systems ("GIS") are computer applications used to manipulate and display geographic data. The data is typically stored as geometric objects, each constituting one or more longitude/latitude points (e.g., points, polylines, polygons and polypolygons). Such geometric representations of geographic objects can be extremely complex, depending on the precision of the representation. For example, a state boundary may constitute ten thousand points (sometimes referred to as "nodes") or more, and a small stretch of coastline can require millions of points if submeter resolution is required.

SUMMARY OF THE INVENTION

A method for storing a plurality data points, each data point representing a geographic location, a first set of data points representing a first geometric object and a second set of data points representing a second geometric object and removing a first data point from the first set of data points representing the first geometric object based on at least a distance between a first location represented by the first data point and a second location represented by a second data point of the second set of data points representing a second geometric object.

A system having a data storage mechanism storing a plurality data points, each data point representing a geographic location, a first set of data points representing a first geometric object and a second set of data points representing a second geometric object and a data reducer removing a first data point from the first set of data points representing the first geometric object based on at least a distance between a first location represented by the first data point and a second location represented by a second data point of the second set of data points representing a second geometric object.

A method for storing a plurality data points, each data point representing a geographic location, a first set of data points representing a first geometric object and a second set of data points representing a second geometric object, determining a first distance between a first location represented by a first data point of the first set of data points representing the first geometric object and a second location represented by a second data point of the first set of data points representing the first geometric object, determining a second distance between the first location and a third location represented by a third data point of the second set of data points representing the second geometric object and determining a relationship between the first and second distances, wherein the first data point is one of removed from the first set of data points and maintained in the first set of data points based on the relationship between the first and second distances.

A method for storing a plurality data points, each data point representing a geographic location, a first set of data points representing a first geometric object and a second set of data points representing a second geometric object, determining spatial relationships between a plurality of data points of the first set of data points and at least one data point of the second set of data points and removing one data point from the first set of data points based on the spatial relationships.

A system having a memory for storing a set of instructions and a processor to execute the set of instructions. The set of instructions being operable to store a plurality data points, each data point representing a geographic location, a first set of data points representing a first geometric object and a second set of data points representing a second geometric object and remove a first data point from the first set of data points representing the first geometric object based on at least a distance between a first location represented by the first data point and a second location represented by a second data point of the second set of data points representing a second geometric object.

DETAILED DESCRIPTION

Figures 1, 2:
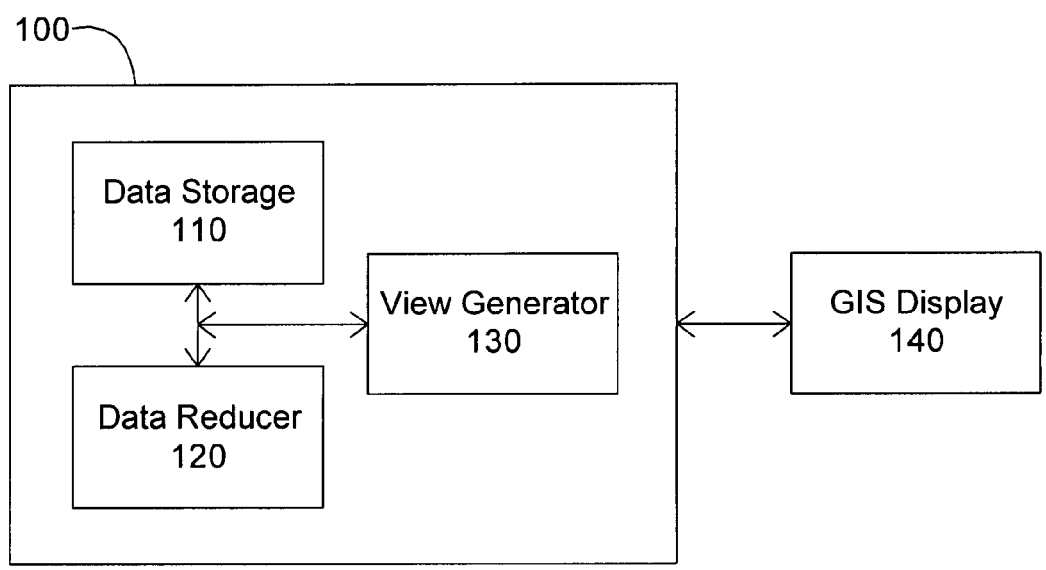
FIG. 1 shows an exemplary table of layers that may be included in a GIS application.
FIG. 2 illustrates an exemplary data reduction system for use with GIS applications according to the present invention.

The present invention may be further understood with reference to the following description and the appended drawings, wherein like elements are referred to with the same reference numerals. The exemplary embodiments of the present invention describe a system and method for determining whether to include a point $P_n$ when reducing the detail of a geometric representation of geographic objects. The exemplary system and method will be further discussed in detail below.

An exemplary GIS display may show various geographical features at varying levels of detail depending on the zoom factor desired by the user. The GIS display may include different types of geographical features on different layers. FIG. 1 shows an exemplary Table 1 showing exemplary layers 10-60 in an exemplary GIS display. This exemplary display includes six (6) layers including Layer 1 (10) having land/water boundaries (e.g., coastline, rivers, etc.); Layer 2 (20) having roads; Layer 3 (30) having buildings; Layer 4 (40) having fiber optic cable runs; Layer 5 (50) having electrical cable runs; and Layer 6 (60) having water line runs. Each of the geographic features in each of the layers 10-60 may be combined to provide exemplary GIS display for the desired geographic area.

Those skilled in the art will understand that the layers described above are only exemplary, and that these and other layers may also be included in or excluded from the GIS display based on the needs of the user. These additional layers may include natural features (e.g., mountains, forests, etc.), man-made features (e.g., streets, gas lines, sewer lines, etc.), and political subdivisions (e.g., state, county, city boundaries, etc.). In addition, each layer may include sub-layers. For example, Layer 5 (50) having electrical cables may include a first sub-layer showing all 480V electrical cables and a second sub-layer showing all 2 kV electrical cables. Those skilled in the art will also understand that the layering model is only exemplary and that the GIS display/system does not need to implement geographical features by layers.

FIG. 2 shows an exemplary GIS system 100 according to the present invention. The GIS system 100 may store each of the geometric objects in a data storage 110 (e.g., a database) as a set of points or nodes. Throughout this description the terms "points" and "nodes" will be used interchangeably to describe the data used to create the geometric objects. In one exemplary embodiment, this data is a latitude/longitude pair defining a geographic location, e.g., each point or node includes data representing a latitude/longitude location. Those skilled in the art will understand that the use of a database as a data storage mechanism 110 is only exemplary. Other known data storage mechanisms 110 may also be used. The GIS system 100 may then transmit the objects via a view generator 130 to a client application (e.g., GIS display 140), that allows "panning" and "zooming" of the GIS display. As described previously, each of the objects may include hundreds or thousands of nodes and there may be many objects on any particular display. Thus, due to the immense amount of data involved, it may be desirable for objects shown at higher zoom levels (i.e. lower magnification) to be transmitted and represented in reduced detail. It should be noted that FIG. 2, which shows the GIS display 140 as external to the GIS system 100, is only exemplary, and that a GIS system may have a GIS display as part of the system.

Therefore, the exemplary GIS system 100 includes a data reducer 120 to reduce the number of data points that are used to represent an object. In one exemplary embodiment of the present invention, the data reducer 120 reduces the data points representing various objects prior to transmission of the objects by the view generator 130 to the client application (e.g., GIS display 140). In this exemplary embodiment, the GIS system 100 will continue to store all the points associated with each object in data storage 110, but the data reducer 120 will limit the data that is sent by the view generator 130 to the GIS display 140. Specifically, the data reduction is performed when the GIS system 100 receives a specific view request from the GIS display 140.

In another exemplary embodiment, the data reducer 120 is used to limit the number of data points that are stored for each object in data storage 110. Specifically, the data reduction is performed when the GIS system 100 is storing the objects representing the geographical information, resulting in a reduced-size data set. Thus, in this exemplary embodiment, the data reduction may be used to limit storage and/or processing requirements within the GIS system 100, in addition to the reduced set of transmitted points described in the above exemplary embodiment. Those skilled in the art will also understand that the data reducer 120 may be used to implement both of the above described data reductions (e.g., when the objects are being stored and when the objects are being formatted for a view).

Figure 3:
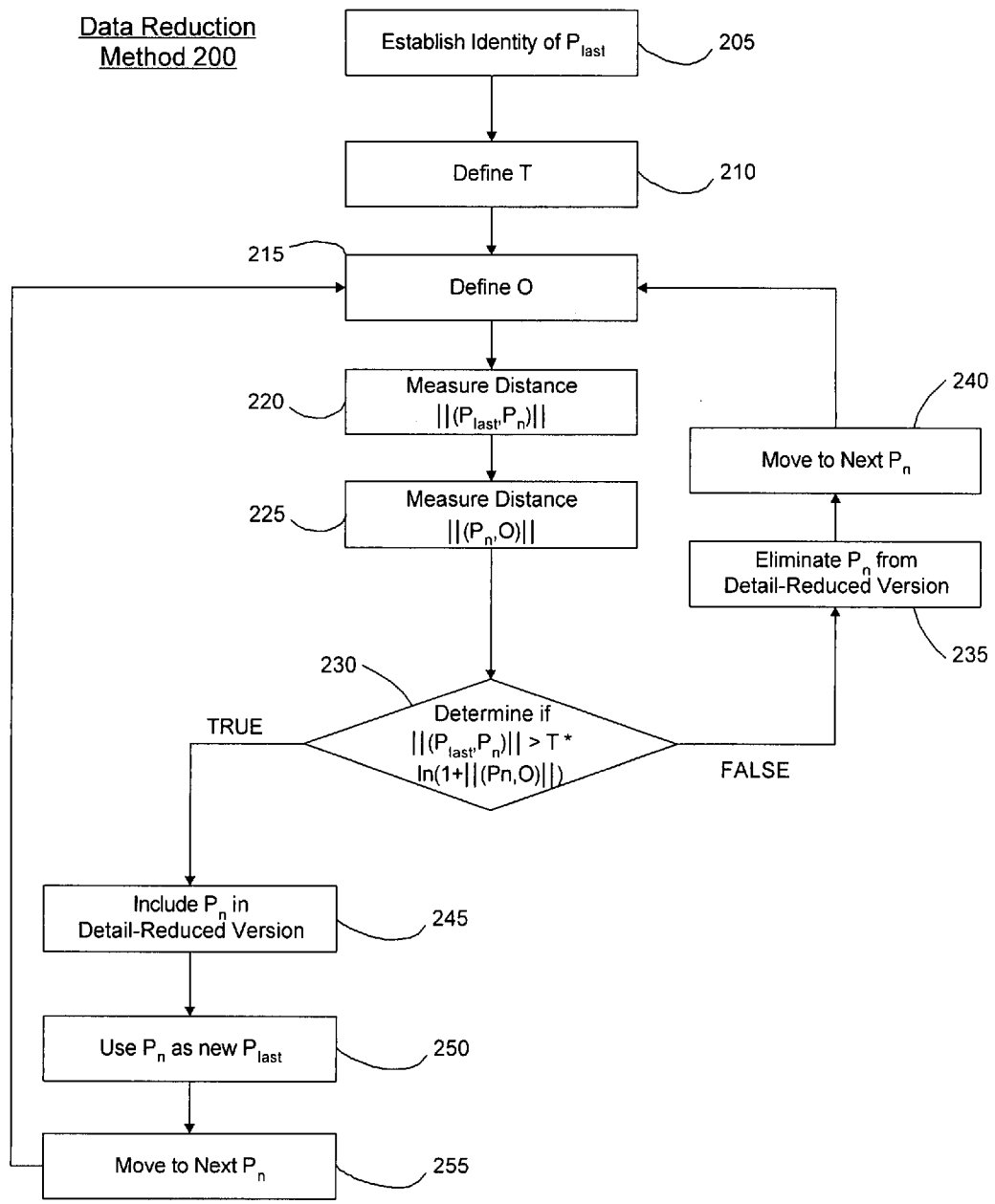
FIG. 3 illustrates an exemplary embodiment of a method to determine whether to include a node $P_n$ in a detail-reduced version of a geometric representation of a geographic object according to the present invention.

The data reducer 120 is used to remove some fraction of the object's points/nodes based on a desired level of detail reduction. FIG. 3 shows an exemplary embodiment of a method 200 to determine whether to include a node $P_n$ in a detail-reduced version of a geometric representation of a geographic object according to the present invention. In step 205, the identity of node $P_{last}$ is established. At the beginning of the detail reduction process, $P_{last}$ may be, for example, an endpoint if the geometric object to be simplified is a polyline, or may be some other beginning point if the geometric object is, for example, a polygon or a polypolygon. As the method iterates, $P_{last}$ is repeatedly redefined, as will be discussed below.

In step 210, a threshold distance value ("T") is defined. T may be any distance that is selected to achieve a desired level of detail reduction in order to improve performance and/or meet storage or processing constraints. As will be described in greater detail below, in the exemplary data reduction method, the initial threshold value is dynamically adjusted based on Euclidian distance from "directorial objects. Thus, the level of detail in any particular location may be dependent on the type of objects that are present in the area.

In step 215, the identity of the nearest directorial object ("O") to the object that is to be detail-reduced is determined. A directorial object is an object that controls the level of detail reduction. Any object or set of objects may be defined as directorial. For example, in a GIS application displaying fiber-optic cables, the fiber-optic cable layer may be classified as "directorial." Thus, every fiber-optic cable object will be a directorial object. The objects on other layers (e.g., streets, political boundaries, hydrologic features, etc.) may then be node-reduced on the basis of their proximity to fiber-optic cable objects. For example, a highway may have less detail removed in areas where it closely approaches a fiber-optic cable, and more detail removed in other areas. Those skilled in the art will understand that more than one layer or more than one type of object may be defined to be directorial.

In step 220, the distance from the previous included point, $P_{last}$, to the point being evaluated, $P_n$, is determined. As described above, at the beginning of the reduction process $P_{last}$ may be, for example, an endpoint. It may be assumed that the endpoint will remain in the data set. Thus, the evaluated point $P_n$ will be the next closest node to the endpoint. As the data reduction process continues, $P_{last}$ will increment to be the node that was the last node to remain in the data set (i.e. a node that was evaluated and not reduced from the data set). In step 225, the distance from $P_n$ to the nearest directorial object O is determined.

In step 230, the threshold value T is weighted based on the proximity of $P_n$ to O. In this exemplary embodiment, the weighted value is set to $T*\ln(1+\|(P_n,O)\|)$. Those skilled in the art will understand that the above weighted value is only exemplary, and that the weighting may be based on any other function of the threshold value T and the distance between $P_n$ and O. It should be noted that other data reduction algorithms may be used to evaluate whether to exclude $P_n$ from the data set. Another exemplary data reduction algorithm may evaluate $P_n$ based on angular displacement. For example, a ray drawn from $P_{last}$ to $P_n$ would be compared to a ray drawn from $P_{last-1}$ (the included node prior to $P_{last}$) to $P_{last}$, and $P_n$ would be included in the detail-reduced version if the angle between the two rays exceeded a given threshold angle. As in the previous exemplary algorithm, the threshold angle could be weighted based on the distance between $P_n$ and the nearest directorial object O.

It should also be noted that while the determination is shown in equation form, other methods of making the determination (e.g., using a lookup array that substitutes fixed threshold values for given distance ranges) may also be used. While this description describes a node reduction process, the test being applied in step 230 is a node inclusion test, i.e., if the value is greater than the weighted threshold, the node remains included in the data set. The node inclusion test performed in step 230 may be represented as $\|(P_n,P_{last})\|>T*\ln(1+\|(P_n,O)\|)$, wherein node $P_n$ is included in the detail-reduced data set if the indicated greater-than test is true.

If, in step 230, the current node $P_n$ does not pass the node inclusion test, the process continues to step 235, where the current $P_n$ being evaluated is removed from the detail-reduced version of the geometric representation. The method then moves to step 240 to consider the next $P_n$. Operation of the method then repeats beginning at step 215, which is discussed above.

If, in step 230, the current node $P_n$ passes the node inclusion test, the process continues to step 245, where $P_n$ is included in the detail-reduced version of the geometric object being detail-reduced. In step 250, the current $P_n$, having been included in the detail-reduced version, is established as the new $P_{last}$ (the last included point). In step 255, $P_n$ is redefined as the next point being considered for elimination. After step 255, operation of the method then repeats beginning at step 215, which is discussed above.

Figure 4A:
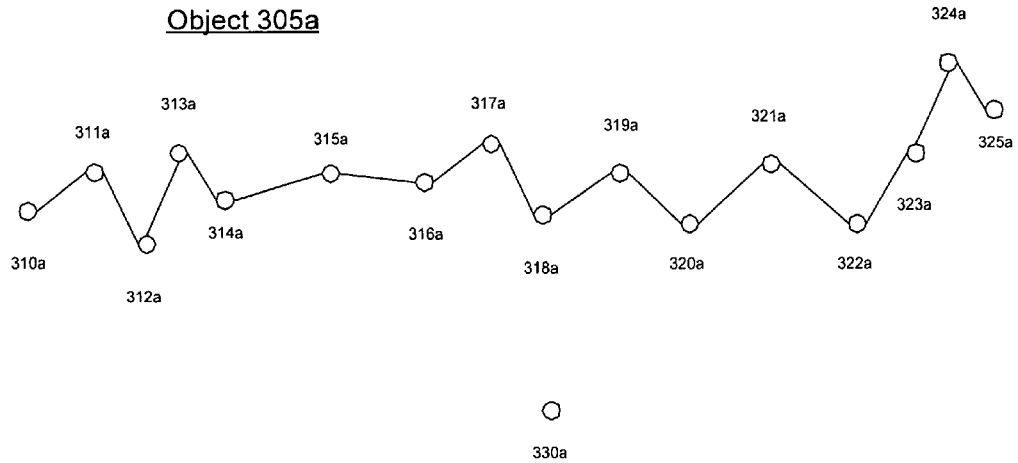
FIGS. 4a and 4b illustrate views of an exemplary geometric representation of a geographic object as contained in a GIS application, before and after application of the exemplary data reduction method of FIG. 3.
Figure 4B:
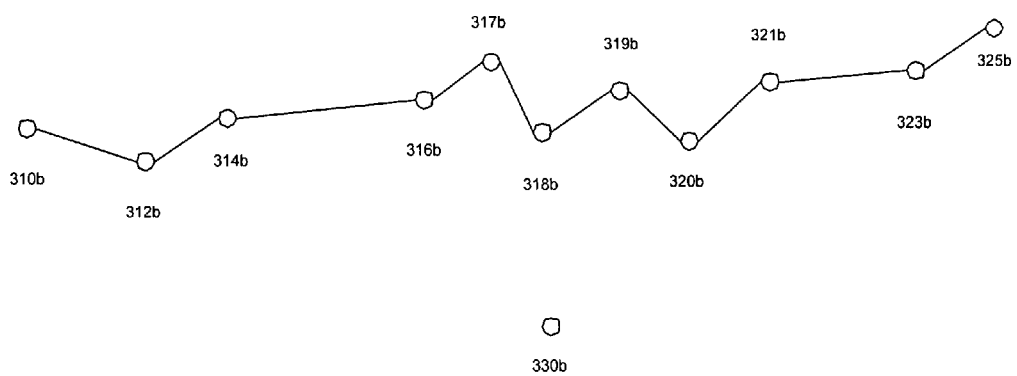

FIGS. 4a and 4b show an example of node reduction as performed by the exemplary method of FIG. 3. FIG. 4a shows an exemplary geometric representation of a geographic object before node reduction; FIG. 4b shows the same geometric representation after node reduction has been performed. As the node reduction illustrated through FIGS. 4a and 4b is only intended to demonstrate, in general terms, the results of the exemplary method, calculations pertaining to the method discussed above will not be shown. Specifically, as described above, the Euclidian distance is used in the node reduction, and FIGS. 4a and 4b are not intended to be drawn to scale.

Object 305a comprises nodes 310a, 311a, 312a, 313a, 314a, 315a, 316a, 317a, 318a, 319a, 320a, 321a, 322a, 323a, 324a, 325a. Directorial object 330a/330b is of the type discussed above in reference to step 215. Object 305b shows object 305a after the exemplary method of FIG. 3 has been applied, and comprises nodes 310b, 312b, 314b, 316b, 317b, 318b, 319b, 320b, 321b, 323b, 325b.

After application of the node reduction method, nodes 311a, 313a, 315a, 322a, and 324a may be eliminated (resulting in the absence of nodes 311b, 313b, 315b, 322b, and 324b). While the distance from node 316a to node 317a is comparable to the distance from node 310a to node 311a, the weighting of the threshold distance T on the basis the proximity of $P_n$ to the nearest directorial object 330a may cause node 317b to be kept in detail-reduced object 305b, while node 311a may be eliminated. Similarly, because node 322a is further from directorial object 330a than, for example, node 318a, node 322a may be eliminated while node 318b is not, though both are of comparable distance from their preceding nodes.

By application of the exemplary method, a higher level of detail may remain in the portion of object 305b that is closest to directorial object 330b, while more detail may be eliminated further away from directorial object 330b. Thus, by applying the exemplary method, very large reductions in data set size and increases in performances can be achieved, without sacrificing image detail where it is relevant to the needs of the application. While the detail reduction shown by exemplary FIGS. 4a and 4b is 31.25% (removal of 5 nodes from an original set of 16), it should be noted that, when used in actual GIS applications, the exemplary method can achieve significantly larger detail reduction, on the order of 1,000%. The exemplary method is suited for both demand-based detail reduction and for batch processing of large GIS data sets.

Those skilled in the art will understand that the above described exemplary embodiment may be implemented in any number of manners, including, for example, as a separate software module, as a combination of software, etc.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory memory storing a set of instructions executable by a processor to perform a method, the method comprising:
    storing a plurality of data points, each data point representing a geographic location, a first set of data points organized into a first geometric object representing a first geographical feature and a second set of data points organized into a second geometric object representing a second geographical feature; and
    removing a first data point from the first set of data points based on at least a first distance between a first location represented by the first data point and a second location represented by a second data point of the second set of data points, wherein the removing is further based on a second distance between the first location represented by the first data point and a third location represented by a further data point of the first set of data points, wherein the removing is further based on a relationship between the first and second distances.

2. The non-transitory memory of claim 1, wherein the method further comprises:
    displaying the first and second geometric objects, wherein the first geometric object is displayed without the first data point.

3. The non-transitory memory of claim 1, wherein the method further comprises:
    storing the first geometric object without the first data point.

4. The non-transitory memory of claim 1, wherein the first and second geographical features are one of a natural feature, a manmade feature or a political subdivision feature.

5. The non-transitory memory of claim 1, wherein the method further comprises:
    receiving an indication defining the second geometric object as a directorial object.

6. The non-transitory memory of claim 1, wherein the removing is further based on a dynamic threshold value, the dynamic threshold value being set based on a zoom level at which the geometric objects are to be displayed.

7. The non-transitory memory of claim 1, wherein the removing is based on the following formula:

$$\|(P_n, P_{last})\| > T^* \ln(1 + \|(P_n, O)\|),$$

where Pn is the first data point, Plast is a further data point of the first geometric object, T is a threshold value and O is the second node.

8. A system, comprising:
    a data storage mechanism storing a plurality of data points, each data point representing a geographic location, a first set of data points organized into a first geometric object representing a first geographical feature and a second set of data points organized into a second geometric object representing a second geographical feature; and
    a data reducer removing a first data point from the first set of data points based on at least a first distance between a first location represented by the first data point and a second location represented by a second data point of the second set of data points, wherein the removing is further based on a second distance between the first location represented by the first data point and a third location represented by a further data point of the first set of data points, wherein the removing is further based on a relationship between the first and second distances.

9. The system of claim 8, further comprising:
    a view generator creating a viewable display of the geometric objects from the nodes.

10. The system of claim 9, further comprising:
    a display displaying the viewable display of the geometric objects.

11. The system of claim 9, wherein the view generator receives a request for the viewable display.

12. The system of claim 11, wherein the data reducer performs the removing after the view generator receives the request for the viewable display.

13. The system of claim 8, wherein, after the first data point is removed by the data reducer, the data storage mechanism re-stores the first geometric object without the first data point.

14. The system of claim 8, wherein the first and second geographical features are one of a natural feature, a manmade feature or a political subdivision feature.

15. A non-transitory memory storing a set of instructions executable by a processor to perform a method, the method comprising:
   storing a plurality of data points, each data point representing a geographic location, a first set of data points organized into a first geometric object representing a first geographical feature and a second set of data points organized into a second geometric object representing a second geographical feature;
   determining a first distance between a first location represented by a first data point of the first set of data points and a second location represented by a second data point of the first set of data points;
   determining a second distance between the first location and a third location represented by a third data point of the second set of data points; and
   determining a relationship between the first and second distances.

16. The non-transitory memory of claim 15, wherein the relationship between the first and second distances is determined based on the following formula:

$$\|(P_n, P_{last})\| > T^* \ln(1 + \|(P_n, O)\|),$$

where Pn is the first data point, Plast is the second data point, T is a threshold value and O is the third data point.

17. The non-transitory memory of claim 15, wherein the method further comprises:
   removing the first data point from the first set of data points based on the relationship between the first and second distances;
   determining, when the first data point is removed from the first set of data points, a third distance between a fourth location represented by a fourth data point of the first set of data points and the second location;
   determining a fourth distance between the fourth location and the third location; and
   determining a further relationship between the third and fourth distances, wherein the fourth data point is one of removed from the first set of data points and maintained in the first set of data points based on the further relationship between the third and fourth distances.

18. The non-transitory memory of claim 15, wherein the method further comprises:
   maintaining the first data point in the first set of data points based on the relationship between the first and second distances;
   determining, when the first data point is maintained in the first set of data points, a third distance between a fourth location represented by a fourth data point of the first set of data points and the first location;
   determining a fourth distance between the fourth location and the third location; and
   determining a further relationship between the third and fourth distances, wherein the fourth data point is one of removed from the first set of data points and maintained in the first set of data points based on the further relationship between the third and fourth distances.

19. A non-transitory memory storing a set of instructions executable by a processor to perform a method, the method comprising:
   storing a plurality of data points, each data point representing a geographic location, a first set of data points organized into a first geometric object representing a first geographical feature and a second set of data points organized into a second geometric object representing a second geographical feature;
   determining spatial relationships between a plurality of data points of the first set of data points and at least one data point of the second set of data points; and
   removing one data point from the first set of data points based on the spatial relationships, wherein the removing is further based on a second distance between the first location represented by the first data point and a third location represented by a further data point of the first geometric object, wherein the removing is further based on a relationship between the spatial relationships and second distance.

20. The non-transitory memory of claim 19, wherein the spatial relationships are one of distance relationships and angular relationships.

* * * * *